Feb. 8, 1949. A. V. L. C. DEBRIE 2,461,039
DEVELOPING SPOOL FOR FILMS
Filed Nov. 1, 1945
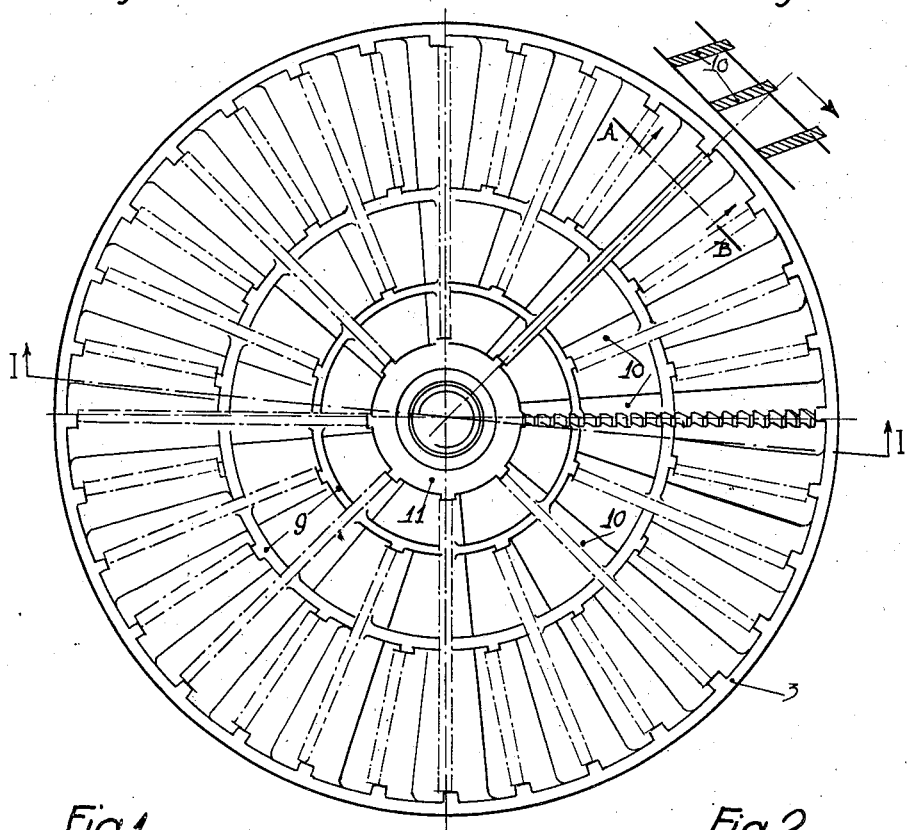
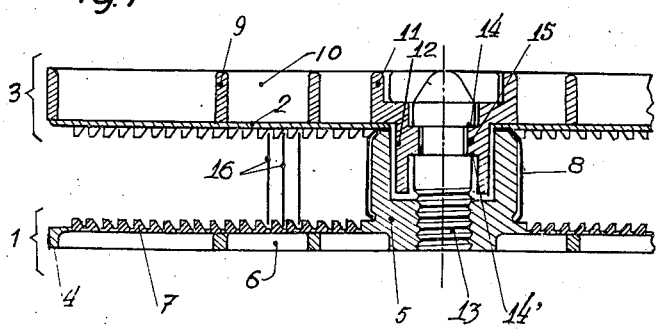
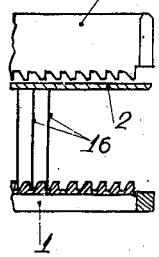

Patented Feb. 8, 1949

2,461,039

UNITED STATES PATENT OFFICE 2,461,039

DEVELOPING SPOOL FOR FILMS

Andre Victor Leon Clement Debrie, Paris, France

Application November 1, 1945, Serial No. 626,062
In France January 3, 1945

5 Claims. (Cl. 242—77)

For the development of strips of small length, in particular for microfilms, it is known to make use of spools made of any suitable substance, on which the film to be treated is wound and which is dipped, after loading, into a tank containing the treating bath.

Various devices have been proposed hitherto, in this connection, said devices differing as to the mode of loading. According to one of these devices, the film is wound between two parallel discs, one of which is smooth, whilst the other is provided with a spiral groove, the depth of which is such that the distance between the bottom of the groove and the smooth disc is equal to the width of the film. This film is introduced slantingly into the groove and, thereafter, it tends to right itself so as to become perpendicular to both discs. With this device, loading is easily effected by imparting to the spool a rotary movement; however, the film is imperfectly held, so that the film convolutions may stick one against the other when they are wetted by the bath. According to another device, the film is wound between two discs each provided with a spiral groove, the distance between the bottoms of these two grooves being equal to the width of the film. This device has the drawback of being difficult to load, such loading being effected only by gradually pushing the film between the two discs so that, practically, the use of this device can only come into consideration for strips of very small length, less than two meters for example.

The object of the present invention is a spool embodying both the above devices but which obviates the drawbacks peculiar to each of them. This spool is constituted by a stationary disc provided with a spiral groove, a stationary smooth disc provided with suitable perforations, and a series of removable combs passing through the openings in the smooth disc. During loading, the combs are in a retracted position out of the spool, so that the winding of the film is easily carried out between the stationary grooved disc and the smooth disc; they are then lowered so as to support the film by its two edges during the treatment and thus prevent any contact between successive convolutions.

In the preferred form of embodiment of the invention, the combs are directed along radii of the discs and are inclined relatively to the vertical so that the whole structure constitutes a kind of a helix, the object of which is a double one; on the one hand, during the treatment in the baths, it is simply necessary to impart to the spool, the combs of which form a helix, a rotary movement in order to produce a liquid current which circulates between the film convolutions and thus ensures the regularity and speed of the chemical treatment; on the other hand, the film, once developed, may be dried on the spool itself, which is set in motion by any suitable means. The helix formed by the combs produces stirring of the air as it previously produced stirring of the liquid, and ensures drying. The grooved disc, moreover, is itself provided with openings in order to render more effective these stirring movements.

A form of embodiment of the invention is illustrated by way of example in the accompanying drawings, in which:

Figure 1 is a transverse section taken on the line I—I of Fig. 2 of the spool as a whole, in the position of treatment, Figure 2 is a partial view showing the position of the comb during loading, Figure 3 is a plan view of the comb, seen from below, Figure 4 is a section thereof taken on the line AB of Figure 3.

The developing spool according to the invention is essentially composed of a disc 1 having a grooved face, of a smooth disc 2 and of a comb block 3.

The lower disc 1 (Figure 1) is composed of an outer ring 4, a central core 5 and of radial arms 6 connecting the ring 4 to the core 5. On said arms is arranged a spiral band 7, made of any suitable material, in the convolutions of which the film to be developed enters. The arms 6 are joined together by concentric circular ribs. The core 5 exhibits at its centre a screw-threaded portion, the object of which will hereinafter be explained.

The smooth disc 2, which is of reduced thickness, is provided, on its inner face, with a resilient tube 8 forming a hub which is secured to the core 5 of the disc 1. When in service, the discs 1 and 2 are integral with one another and they are only separated when it is desired to dismount the spool in order to clean it. The disc 2 is provided with the necessary openings for the passage, with substantial play, of the combs hereinafter to be described.

Referring now to the comb block 3 (Figures 1 and 3), it is constituted by concentric circles 9 carrying the combs 10. The inner circle 11 rests on the edges of a central hole in the plate 2 and is extended by a hub 12 entering a recess of the core 5. A thumb screw 13 provided with two shoulders 14 and 14' enclosing a circular projection 15 of the hub 12 enters the screw-threaded portion of the core 5 and thus enables the block 3 to be raised or lowered. The combs are constituted by radial elements which pass through the openings in the disc 2. These radial elements are of unequal lengths so as to leave between them sufficient free spaces near the centre of the spool and ensure, at the same time, satisfactory supporting of the film at its periphery, and are, on the other hand, inclined with respect to the vertical (Figures 3 and 4). When the whole device is rotated in a bath around its vertical axis, the inclined combs, acting as an helix, give rise to a vertical flow of liquid which circulates between the films convolutions. When the rotation is effected in air, a vertical air current is produced and ensures a rapid stirring.

The operation of the device can be easily understood. In order to load the spool, the block is brought into the position of Fig. 2 in which the combs 10 do not project through the disc 2, the film 16 is then wound in the groove of the disc 1 formed by the helix 7, by introducing it slantingways, as shown for the last winding, this being easily effected by sliding on the smooth disc 2. When this winding operation is completed, the screw 13 is screwed so as to cause the block 3 to descend, its comb teeth then projecting below the disc 2 (Fig. 1). The film, whose windings are, then, all vertical, is firmly held by both its edges and may be subjected to chemical treatments and to drying under the conditions set forth above.

What I claim is:

1. Developing spool for film strips of small length, and more particularly for microfilms, comprising in combination a stationary disc, a spiral-shaped groove on said disc, a smooth disc with openings which is also stationary, the film being wound between said first disc and said smooth disc, and combs the teeth of which project through said openings after loading of the film, in order to hold said film between said teeth and the spiral-shaped groove of the first disc.

2. Developing spool for film strips of small length, and more particularly for microfilms, comprising in combination a stationary disc, a spiral-shaped groove on said disc, a smooth disc with radial openings which is also stationary, the film being wound between said first disc and said smooth disc, and radial combs inclined relatively to the vertical, and the teeth of which project through said openings after loading of the film, in order to hold said film between said teeth and the spiral-shaped groove of the first disc.

3. Developing spool for film strip of small length and more particularly for microfilms comprising in combination a stationary disc with openings, a spiral-shaped groove on said disc, a smooth disc with openings which is also stationary, the film being wound between said first disc and said smooth disc, combs the teeth of which project through the openings of the smooth disc after loading of the film, in order to hold said film between said teeth and the spiral-shaped groove of the first disc.

4. Developing spool for film strips of small length and more particularly for microfilms, comprising in combination a stationary disc, which is constituted by a spiral strip and radial arms supporting the same, a smooth disc with openings, which is also stationary, the film being wound between said first disc and said smooth disc, and combs the teeth of which project through said openings after loading of the film, in order to hold the film between said teeth and the spiral-grooved disc.

5. Developing spool for film strips of small length and more particularly for microfilms, comprising in combination a stationary disc which is constituted by a spiral strip and radial arms supporting the same, a smooth disc with radial openings which is also stationary, the film being wound between said first disc and said smooth disc, radial combs inclined relatively to the vertical, and the teeth of which project after loading of the film, through said openings.

ANDRE VICTOR LEON CLEMENT DEBRIE.

REFERENCES CITED

The following references are of record in the file of this patent:

UNITED STATES PATENTS

| Number | Name | Date |
|---|---|---|
| 2,351,396 | Broms | June 13, 1944 |
| 2,409,384 | Peterson | Oct. 15, 1946 |

FOREIGN PATENTS

| Number | Country | Date |
|---|---|---|
| 526,338 | Germany | June 5, 1931 |